No. 884,390.
PATENTED APR. 14, 1908.
W. L. JERKINS.
MEDICINE SPOON.
APPLICATION FILED JUNE 28, 1907.
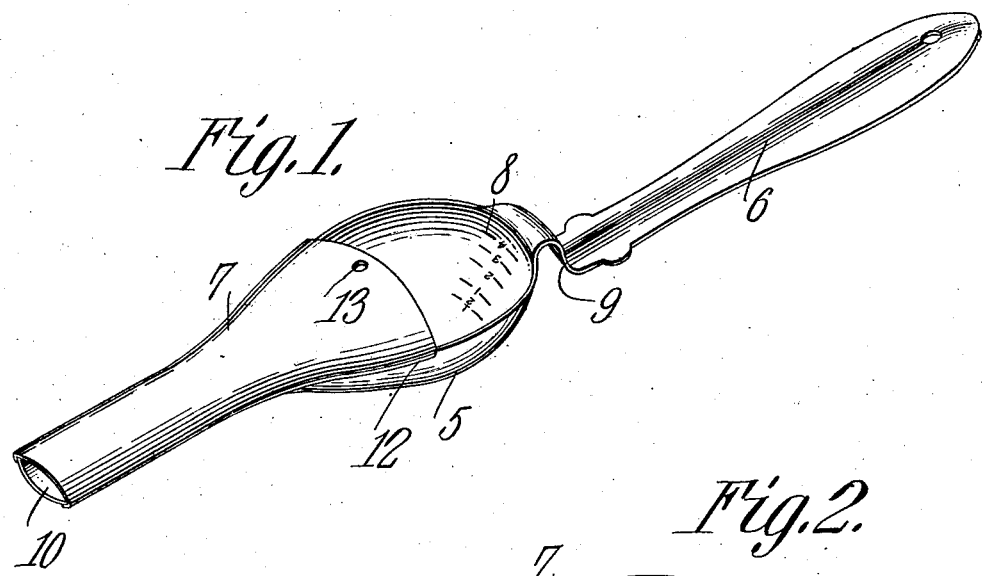
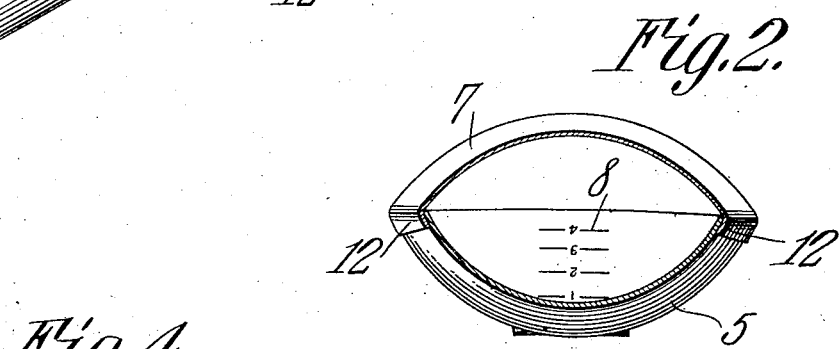
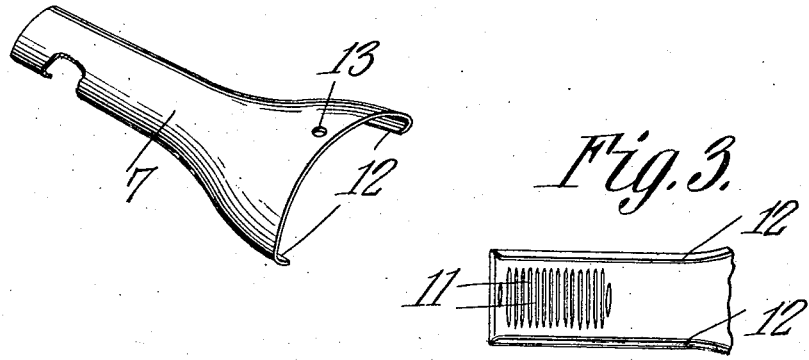
WITNESSES:
William L. Jerkins, INVENTOR
By C. A. Snow & Co.
ATTORNEYS

UNITED STATES PATENT OFFICE.

WILLIAM L. JERKINS, OF MOULTRIE, GEORGIA.

MEDICINE-SPOON.

No. 884,390.   Specification of Letters Patent.   Patented April 14, 1908.

Application filed June 28, 1907. Serial No. 381,370.

*To all whom it may concern:*

Be it known that I, WILLIAM L. JERKINS, a citizen of the United States, residing at Moultrie, in the county of Colquit and State of Georgia, have invented a new and useful Medicine-Spoon, of which the following is a specification.

This invention relates to medicine spoons.

The present invention is designed as an improvement upon a medicine spoon for which Letters-Patent of the United States were granted me January 2, 1906, and numbered 808,845. The spoon constituting the subject-matter of the said patent embodies a bowl having a spout and a guard cover, the latter being permanently attached to the bowl spout. While thoroughly effective for the purpose designed, it has been found in practice that it is a desideratum to have the guard detachably combined with the spoon in order to permit thorough cleansing thereof, thus not only to remove the remains of any medicine with which the bowl might have been filled, but also to render the article sanitary.

It is the object of the present invention, in a ready and practical manner, so to combine the guard with the spoon as while securing a stable connection between the parts the guard may be removed, and replaced with readiness and ease.

With the above and other objects in view, as will appear as the nature of the invention is better understood, the same consists, generally stated, in a medicine spoon having a guard or cover combined therewith in such manner as to permit of its ready removal when desired, and further, in so combining the cover with the spoon as positively to preclude accidental separation in use.

The invention consists further in the various novel details of construction of a medicine spoon as will be hereinafter fully described and claimed.

In the accompanying drawings forming a part of this specification and in which like characters of reference indicate corresponding parts,—Figure 1 is a view in perspective of a medicine spoon constructed in accordance with my invention. Fig. 2 is a transverse sectional view on an enlarged scale, through the bowl. Fig. 3 is a bottom plan view of the spout with the guard in position thereon. Fig. 4 is a perspective view of the guard or cover detached.

Referring to the drawings 5 designates the bowl of the spoon, 6 the handle and 7 the guard or cover these parts may be made of any suitable material preferably of a non-oxidizable metal. The bowl of the spoon is 30 provided with a series of graduations 8, the first of which indicates one-half a dram and the remaining graduations, drams. The handle is joined to the bowl by a substantially rectangular bend 9 and the under side of the bowl and handle are disposed in the same plane, the object of the arrangement being to permit the spoon to occupy a perfect flat position upon a table thus to secure accurate measurement of a medicine.

The bowl is formed with a relatively narrow elongation 10 which in conjunction with the guard 7 forms a spout so that the medicine may be conveniently administered. The under side of the spout is preferably corrugated or roughened transversely, as indicated at 11 to assist in preventing accidental displacement of the spoon and also in order to adapt it to hold the tongue against movement when examination of the throat is necessary, as in case of tonsilitis or other throat troubles. The guard 7 is curved to conform to the shape of the bowl and spout 10, respectively, while the opposite longitudinal edges of the metal forming the spout are bent laterally to produce inwardly extending flanges 12 which yieldably engage the exterior walls of the bowl and spout, respectively, and serve to hold the guard in position on the spoon. The inner end of the guard 7 is bent or curved upwardly to form a housing for a portion of the bowl 5, said curved portion being provided with an aperture 13 adapted to receive a suitable tool thereby to assist in withdrawing the cover or guard 7 from engagement with the bowl.

Attention is here called to the fact that the exterior walls of the bowl and spout at the upper edge of the spoon are smooth and unobstructed while the guard is provided with oppositely disposed inwardly extending flanges curved to conform to the exterior walls of the spoon and adapted to yieldably engage the same for locking the guard in position on said spoon. It will also be noted that when the guard is in position on the spoon the flange 12 will bear snugly against and conform to the exterior walls of the bowl and spout, respectively, so as to present a smooth bearing surface and thus prevent injury to the mouth and lips when administering medicine.

In order to remove the guard to permit cleaning of the spoon it is merely necessary to introduce an awl or other pointed instrument in the aperture 13 and exert a slight longitudinal pull in the direction of the spout 10 when the guard may be readily withdrawn from the spout thereby to permit the spoon as well as the guard to be thoroughly cleaned.

The spoons may be made in different sizes and shapes and may be nickeled or otherwise coated or plated to prevent rusting or corroding.

Having thus described the invention what is claimed is:

1. A spoon embodying an integral bowl and spout having smooth continuous exterior walls at the upper edge of the spoon, and a removable guard slidably mounted on the spoon and forming a closure for the spout and a portion of the bowl, said guard being provided with oppositely disposed inwardly extending flanges curved to conform to the curvature of the exterior walls of the spoon and adapted to frictionally engage the same at the upper edge thereof.

2. A spoon embodying an integral bowl and spout having smooth continuous walls at the upper edge of the spoon, and a removable guard slidably mounted on the spoon and forming a closure for the spout and a portion of the bowl, said guard being provided with oppositely disposed inwardly extending flanges curved to conform to the exterior walls of the spoon and adapted to frictionally engage the same at the upper edge thereof, there being an aperture formed in one end of the guard, and a roughened portion on the lower wall of the spout at the free end thereof.

In testimony that I claim the foregoing as my own, I have hereto affixed my signature in the presence of two witnesses.

WILLIAM L. JERKINS.

Witnesses:
J. M. GEORGE,
W. S. STOKES.